(12) United States Patent
De Guia et al.

(10) Patent No.: US 11,087,347 B1
(45) Date of Patent: *Aug. 10, 2021

(54) HOME MAINTENANCE MONITORING AND REWARDS

(71) Applicant: Allstate Insurance Company, Northbrook, IL (US)

(72) Inventors: Nicolette De Guia, Chicago, IL (US); Kelly Ann Brennan, Lake Zurich, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/660,241

(22) Filed: Oct. 22, 2019

Related U.S. Application Data (63) Continuation of application No. 14/865,199, filed on Sep. 25, 2015, now Pat. No. 10,489,813.

(51) Int. Cl.
G06Q 30/02 (2012.01)
G06Q 10/00 (2012.01)

(52) U.S. Cl.
CPC ......... G06Q 30/0217 (2013.01); G06Q 10/20 (2013.01)

(58) Field of Classification Search
CPC .................. G06Q 30/0217; G06Q 10/20
USPC ..................................... 705/14.19
See application file for complete search history.

(56) References Cited

U.S. PATENT DOCUMENTS

| 7,289,965 | B1 | 10/2007 | Bradley et al. |
| 7,827,121 | B2 | 11/2010 | Mitsuda |
| 8,078,491 | B1 | 12/2011 | Carragher et al. |
| 8,160,922 | B2 | 4/2012 | Postrel |
| 8,473,380 | B2 | 6/2013 | Thomas et al. |

(Continued)

FOREIGN PATENT DOCUMENTS

WO     9204174 A1    3/1992
WO     WO-9204174 A1 *  3/1992  ........... B29C 45/768

OTHER PUBLICATIONS

Jim Hesket, How Should Pay Be Linked to Performance, 2007 (Year: 2007).*

(Continued)

*Primary Examiner* — Tarek Elchanti
(74) *Attorney, Agent, or Firm* — Banner & Witcoff, Ltd.

(57) ABSTRACT

Methods, computer-readable media, systems and apparatuses for home maintenance monitoring and rewarding users for completion of various home maintenance tasks are provided. The systems may receive data associated with a home, such as a plurality of systems and/or devices associated with the home. Based on the received information, the systems may generate a maintenance task list for the home including a plurality of maintenance tasks. Data related to maintenance performed on the home may be received and, based on the received maintenance data, a determination may be made as to whether one or more tasks on the maintenance task list have been completed. Upon completion of a task, a reward, such as points, discounts on future maintenance, insurance premium discounts, etc., may be deposited in an account of the user. In some arrangements, the points may be redeemed as payment on future maintenance, payment on insurance premiums, or the like.

20 Claims, 8 Drawing Sheets

(56) References Cited

U.S. PATENT DOCUMENTS

| | | | |
|---|---|---|---|
| 10,489,813 B1* | 11/2019 | De Guia | G06Q 10/20 |
| 2002/0032626 A1 | 3/2002 | DeWolf et al. | |
| 2002/0143564 A1 | 10/2002 | Webb et al. | |
| 2003/0040934 A1 | 2/2003 | Skidmore et al. | |
| 2004/0098279 A1* | 5/2004 | Frazier | G06Q 10/10 |
| | | | 705/302 |
| 2007/0299677 A1 | 12/2007 | Maertz | |
| 2008/0015935 A1 | 1/2008 | Ford | |
| 2008/0065460 A1 | 3/2008 | Raynor | |
| 2008/0114655 A1 | 5/2008 | Skidmore | |
| 2008/0306946 A1 | 12/2008 | Wu | |
| 2010/0274623 A1 | 10/2010 | Thomas | |
| 2011/0270773 A1* | 11/2011 | Siekman | G06Q 10/20 |
| | | | 705/305 |
| 2012/0239581 A1* | 9/2012 | Mosher | G06Q 50/163 |
| | | | 705/302 |
| 2013/0144658 A1 | 6/2013 | Schnabolk et al. | |
| 2013/0226644 A1 | 8/2013 | Alonso et al. | |
| 2013/0275263 A1 | 10/2013 | Carlin, Jr. et al. | |
| 2014/0025528 A1 | 1/2014 | Duker | |
| 2014/0136242 A1* | 5/2014 | Weekes | G06Q 40/08 |
| | | | 705/4 |
| 2014/0172479 A1 | 6/2014 | Gallagher et al. | |
| 2014/0180725 A1 | 6/2014 | Ton-That et al. | |
| 2014/0266669 A1 | 9/2014 | Fadell et al. | |
| 2015/0120349 A1 | 4/2015 | Weiss | |

OTHER PUBLICATIONS

"Discover the Gardens Rewards Program", Gardens Home Management Services, downloaded from <http://www.homecarepro.com/programs/rewards-program> on Nov. 14, 2014.

"The Impact of LEED in India", U.S. Green Building Council, downloaded from <http://in.usgbc.org/leed#overview> on Nov. 19, 2014.

"Brightnest Keeps Track of Your Home Maintenance Needs, Reminds You When Work Should Be Done", Lifehacker.com, downloaded from <http://lifehacker.com/5915404/brightnest-keeps-track-of-your-home-maintenance-needs-reminds-you-when-work-should-be-done>.

"Home Services & Discounts by CCHS", Cross Country Home Services, downloaded from <http://www.cchs.com/home-service-plans> on Nov. 14, 2014.

"Automated Home Maintenance Schedules", HomeZada Home Maintenance Checklist, downloaded from <http://www.homezada.com/home-maintenance.html> on Nov. 14, 2014.

"Repairs and maintenance", National Housing Federation, downloaded from <http://www.housing.org.uk/policy/asset-management/repairs-and-maintenance/> on Nov. 14, 2014.

"How Should Pay Be Linked to Performance", Jim Heskett, HBS Working Knowledge, Harvard Business School, https://hbswk.hbs.edu/item/how-should-pay-be-linked-to-performance, Jun. 2007, pp. 1-27.

* cited by examiner

HOME MAINTENANCE MONITORING AND REWARDS

CROSS REFERENCE TO RELATED APPLICATIONS

This application is a continuation of and claims priority to co-pending U.S. application Ser. No. 14/865,199, filed Sep. 25, 2015, and entitled "Home Maintenance Monitoring and Rewards," which is incorporated herein by reference in its entirety.

TECHNICAL FIELD

Various aspects of the disclosure relate to home maintenance monitoring and reward systems. More specifically, aspects of the disclosure relate to identifying a list of maintenance tasks, determining whether one or more tasks have been completed, and generating points and/or rewards that may be used for subsequent maintenance projects and/or insurance premium discounts, payments, etc., in response to completion of the points.

BACKGROUND

Performing maintenance on a home or other structure is one aspect of maintaining the value of the property and ensuring the home is in good working order. However, often, homeowners are unsure of the different types of maintenance tasks that should be performed, or the time period in which the tasks should be completed. Further, a homeowner or other user may be unaware of particular details associated with different aspects of a home, such as the particular materials used, issues associated with a particular model of an appliance, or the like. These details can have an impact on types of maintenance to be performed, timeframes for completed the maintenance, etc. Accordingly, a system in which information from a variety of sources is used to identifying a plurality of maintenance tasks and reward users for completing the tasks would be advantageous.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems for home maintenance monitoring and rewarding users for completion of various home maintenance tasks. In some arrangements, the system may receive data associated with a home, such as a plurality of systems and/or devices associated with the home. Based on the received information, the system may generate a maintenance task list for the home including a plurality of maintenance tasks. Data related to maintenance performed on the home may be received and, based on the received maintenance data, a determination may be made as to whether one or more tasks on the maintenance task list have been completed. Upon completion of one or more tasks, a reward, such as points, a discount on future maintenance, an insurance premium discount, or the like, may be deposited in an account of the user. In some arrangements, the points may be redeemed as payment on future maintenance, payment on insurance premiums, or the like.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
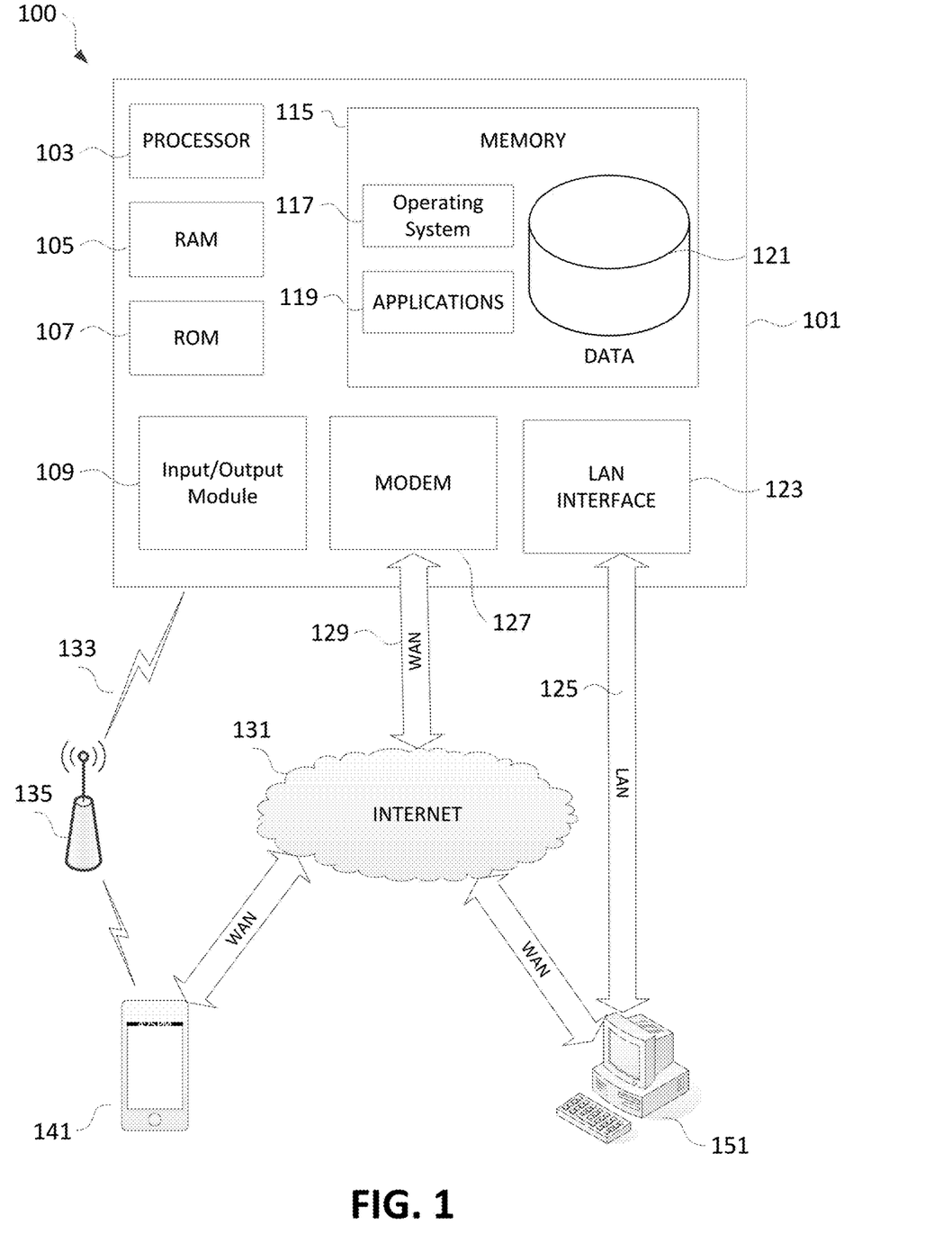
FIG. 1 illustrates computing systems and a network environment that may be used to implement aspects of the disclosure.

FIG. 1 illustrates a block diagram of a computing device (or system) 101 in a computer system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141 and 151, security and integration hardware 160) may correspond to any of multiple systems or devices described herein, such as personal mobile devices, vehicle-based computing devices, insurance systems servers, home monitoring computing devices, external data sources and other various devices in a home maintenance monitoring and reward system. These various computing systems may be configured individually or in combination, as described herein, for monitoring one or more home systems or home device systems, generating a maintenance task list, receiving input regarding tasks on the maintenance task list, and/or generating rewards (e.g., based on completion of one or more tasks), using the devices of the home maintenance monitoring and reward systems described herein. In addition to the features described above, the techniques described herein also may be used for generating and presenting insurance recommendations to customers, insurance underwriting, and other insurance-related tasks.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules or other data. Certain devices and systems within home maintenance monitoring and reward systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., a personal mobile device 101, vehicle-based device 101, insurance system server 101, home monitoring system/server, etc.), in order to collect and analyze user data, home system data, maintenance data, determine whether one or more maintenance tasks are completed and deposit points and/or other rewards in a user account associated with the home being maintained, etc., using the various devices of the home maintenance monitoring and reward systems. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, generate a maintenance task list, receive data associated with one or more tasks, determine whether one or more tasks have been completed, deposit points or other rewards in a user account, determine whether an account threshold has been met.

The computing device (e.g., a personal mobile device, vehicle-based system, insurance system server, home monitoring system/server, etc.) may operate in a networked environment 100 supporting connections to one or more remote computers, such as terminals 141, 151, and 161. Such terminals may be personal computers or servers 141 (e.g., home computers, laptops, web servers, database servers), mobile communication devices 151 (e.g., mobile phones, tablet computers, etc.), vehicle-based computing systems 161 (e.g., on-board vehicle systems, telematics devices, mobile phones or other personal mobile devices within vehicles), home system monitoring devices, and the like, each of which may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 151 and 161 (e.g., mobile phones, portable customer computing devices, vehicle-based computing devices and systems, etc.) via one or more network devices 135 (e.g., base transceiver stations) in the wireless network 133.

Also illustrated in FIG. 1 is a security and integration layer 160, through which communications are sent and managed between the device 101 (e.g., a personal mobile device, a vehicle-based computing device, an insurance server, an intermediary server and/or external data source servers, home system monitoring device, etc.) and the remote devices (141, 151, and 161) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a server 101 may comprise a set of web application servers configured to use secure protocols and to insulate the device 101 from external devices 141, 151, and 161. In some cases, the security and integration layer 160 may correspond to a set of dedicated hardware and/or software operating at the same physical location and under the control of same entities as device 101. For example, layer 160 may correspond to one or more dedicated web servers and network hardware in a home or associated with a home and home information datacenter or in a cloud infrastructure supporting a cloud-based home system data retrieval and analysis. In other examples, the security and integration layer 160 may correspond to separate hardware and software components which may be operated at a separate physical location and/or by a separate entity.

As discussed below, the data transferred to and from various devices in a home maintenance monitoring and reward system 100 may include secure and sensitive data, such as confidential home system operation data, insurance policy data, and confidential user data from users associated with a home. Therefore, it may be desirable to protect transmissions of such data by using secure network protocols and encryption, and also to protect the integrity of the data when stored on the various devices within the system, such as personal mobile devices, vehicle-based devices, insurance servers, external data source servers, home system monitoring devices, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in an electronic display system 100. Data may be transmitted through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., home system data, user data, vehicle data, etc.) between the various devices 101 in the system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, a home system data and/or user data analysis web service, a home maintenance monitoring and reward determination or offer web service, or the like, may be implemented in the security and integration layer 160 using the Secure Sockets Layer (SSL) or Transport Layer Security (TLS) protocol to provide secure connections between servers 101 and various clients 141, 151, and 161. SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a database of home system data, user data, user behaviors or characteristics, account balance data, etc.) is cached in a separate smaller database on an application server separate from the database server (e.g., at a personal mobile device, home system monitoring device, or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of home maintenance monitoring and reward systems, such as faster response times and less dependence on network conditions when transmitting and receiving home system information, user information, account information, reward information and the like.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in home maintenance monitoring and reward system components described herein may be configured to communicate using any of these network protocols or technologies.

Additionally, one or more application programs 119 may be used by the various computing devices 101 within a home maintenance monitoring and reward system 100 (e.g., home system data and/or user data analysis software applications, insurance parameter determination software applications, reward generating applications, etc.), including computer executable instructions for receiving and analyzing various home system data and/or user data, determining maintenance task lists, determining whether one or more maintenance tasks have been completed, depositing points or other rewards in a user account, generating rewards, and determining whether rewards have been redeemed, using the devices of the home maintenance monitoring and reward systems.

Figure 2:
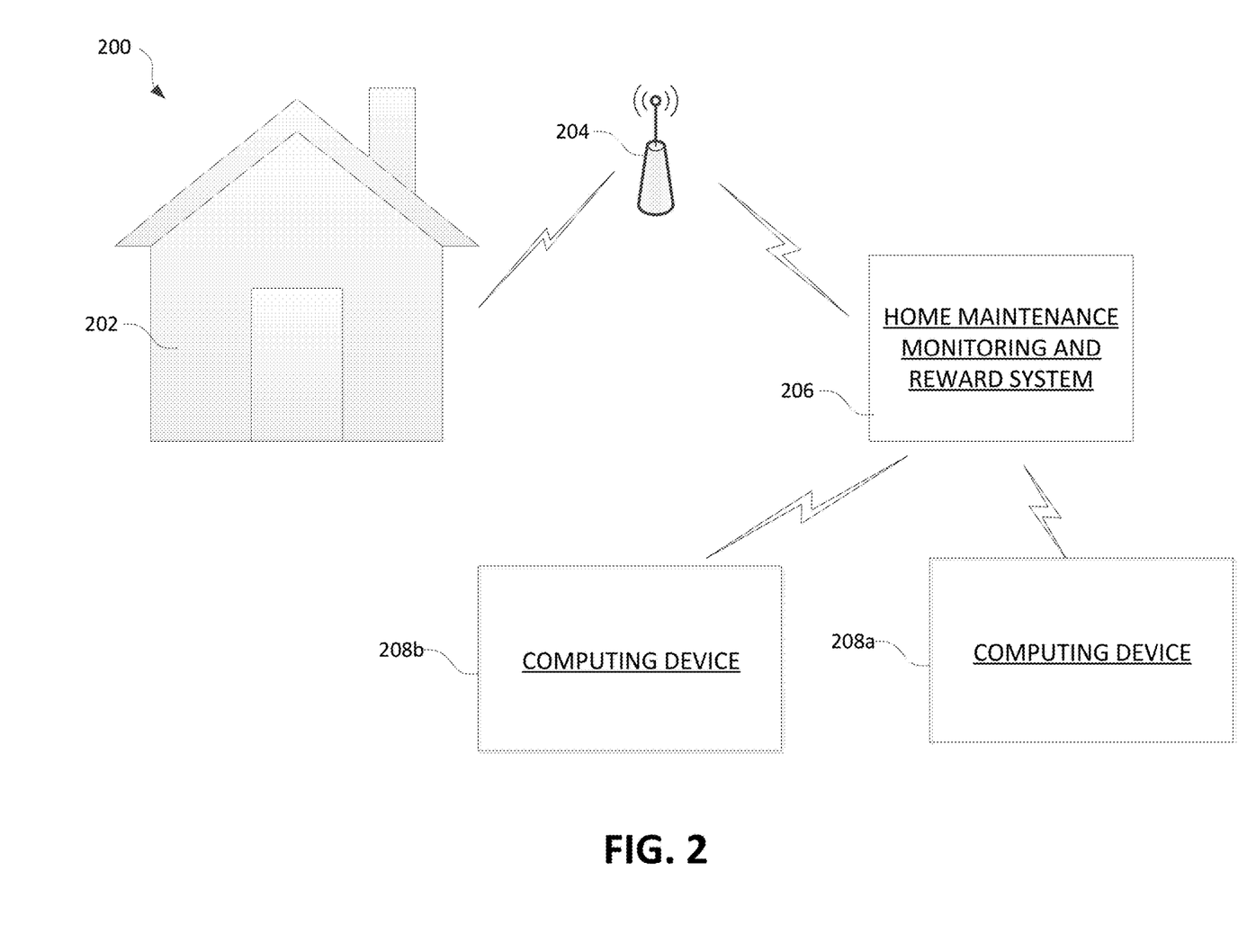
FIG. 2 is an example home maintenance monitoring and reward system environment illustrating various communications between a home (e.g., home systems, devices, etc.), one or more computing devices, and the home maintenance monitoring and reward system, according to one or more aspects of the disclosure.

FIG. 2 is a schematic illustration of a home maintenance monitoring and reward system arrangement according to one or more aspects described herein. As shown in FIG. 2, the arrangement 200 may include a home 202. The home 202 generally includes a variety of systems, appliances, features, and/or devices that may require maintenance or periodic replacement. Some example systems may include (but are not limited to) a roof, driveway, sidewalk, gutters, windows, siding or other exterior covering, appliances, such as a dishwasher, washing machine, dryer, refrigerator, stove, etc.), plumbing, heating/air condition (HVAC) systems, sump pump, electrical systems, and the like. These systems, appliances, features, devices, etc., may be monitored (e.g., either automatically by one or more sensing devices and/or manually by a user) to ensure efficient performance, proper functioning, etc. For instance, one or more sensors or sensing devices may be arranged on or integrated into devices such as hot water heaters, refrigerators, washing machines, dryers, furnaces, air conditioning units, windows (e.g., to detect breakage), pipes (e.g., to detect leakage), utilities or utility meters, such as gas, water, and electric, and the like. In some examples, sensors or other monitoring devices may be arranged on or integrated into paint, bricks, roofing, or other building materials, and the like. Other home devices may include sensors or be monitored without departing from the invention. Additionally or alternatively, a user may observe one or more systems, appliances, devices, etc. to determine whether the object is functioning properly.

In some examples, various types of sensors may be used with the sensing and/or monitoring system. For instance, power sensors, moisture sensors, heat or smoke sensing devices, motion sensors, presence sensors, and the like, may be used. In still other examples, "smart" materials may be used, such as smart paints, smart bricks, and the like, that may provide indications of wear or potential failure.

The home 202 depicted in FIG. 2 may include a plurality of appliances and/or systems and one or more of the appliances and/or systems (e.g., devices) may be monitored by one or more sensing devices, users, entities, etc., as will be discussed more fully below. Signals from the one or more sensing devices may be transmitted to the home maintenance monitoring and repair system 206 at an entity, such as an insurance provider. In some examples, the signals may be wirelessly transmitted and may be transmitted to a base collection unit 204 prior to transmission to the system 206. Alternatively, the signals may be transmitted directly to the system 206, e.g., via wired or wireless means. In some arrangements, the data may be collected in real-time and/or transmitted in real-time or near real-time. Additionally or alternatively, the data may be collected and/or transmitted in batches.

In some examples, home maintenance monitoring and reward system 206 may receive data associated with the home 202. The data may include home maintenance data (e.g., from one or more sensing devices, a user, etc.) and/or general data associated with the home, such as age of home, building materials used in the home, type and age of appliances within the home, and the like. Information associated with the user or owner of the home may also be received by the system 206. Accordingly, the home maintenance monitoring and reward system 206 may determine, based on the received information, a maintenance plan and/or maintenance task list for the home. The maintenance plan may be based on features particular to the home (e.g., age, type of materials used, etc.) as well as aggregated data for similar structures or similar systems (e.g., insurance claim data).

In some examples, the maintenance plan and/or maintenance task list may be transmitted to a computing device, such as computing device 208a or 208b. The computing device 208 may be one or more user computing devices (e.g., laptop, tablet, smart phone, etc.) and may be configured to display the task list as well as various other features and/or aspects discussed herein.

The home maintenance monitoring and reward system 206 may receive operation and/or maintenance data (e.g., from one or more sensing devices, from a user computing device 208, etc.) and may track the maintenance or repairs/replacements performed on the home. Accordingly, as items on the generated task list are completed, they may be marked completed by the system and completion of one or more items on the task list may generate rewards points for a user. That is completion of one or more tasks on the task list may result in, for example, a number of points being deposited into an account of the user. In some examples, additional points may be provided for completing the task in a predefined time period. The user may then accumulate points that may be used to obtain discounts on subsequent maintenance projects, reduction in insurance premiums, or the like. The points may, in some examples, be transferrable with the home (e.g., upon sale or leasing of the home) such that a subsequent user may receive discounts or incentives based on the maintenance history of the home. In other examples, the points may remain with the user and the user may earn discounts and/or rewards based on their history of good maintenance of the previous home. A combination of transferring points to a new owner and maintaining points by the owner may also be provided, as will be discussed more fully herein.

Figure 3:
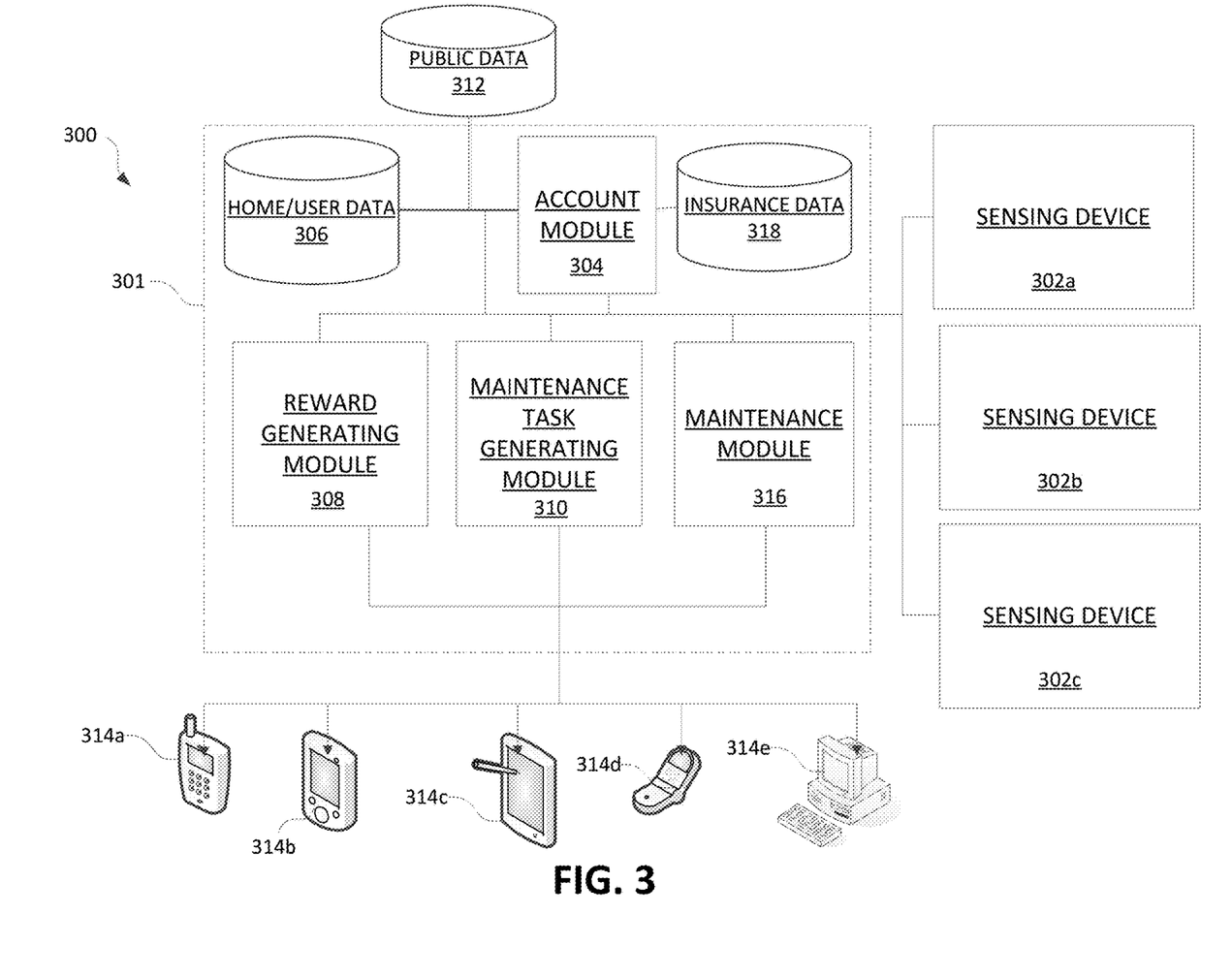
FIG. 3 is an example home maintenance monitoring and reward system according to one or more aspects of the disclosure.

FIG. 3 is a schematic diagram of an illustrative home maintenance monitoring and reward system 300. The home maintenance monitoring and reward system 300 may be associated with, internal to, operated by, or the like, an entity 301, such as an insurance provider. In some examples, the entity may be one of various other types of entities, such as a government entity, corporation or business, university, or the like. Various examples described herein will be discussed in the context of an insurance provider. However, nothing in the specification should be viewed as limiting use of the systems, methods, arrangements, etc. described herein to use only by an insurance provider.

The home maintenance monitoring and reward system 300 may include one or more modules that may include hardware and/or software configured to perform various functions within the system 300. The one or more modules may be separate, physical devices or, in other examples, one or more modules may be part of the same physical device. Further, each module may include specific hardware and/or software configured to perform various functions within the system 300, as will be discussed more fully below.

The home maintenance monitoring and reward system 300 may include a maintenance task generating module 310. The maintenance task generating module 310 may include hardware and/or software configured to perform various functions within the system 300. For instance, the maintenance task generating module 310 may receive data associated with a home and/or user. The data may include types of systems and/or devices within the home (e.g., list of appliances, list of systems/features, etc.). The received data may further include make and/or model of appliances, age of system/device, type of material(s) used in building, etc. The received information may further include information associated with the user or owner of the home (e.g., name, contact information, insurance information, etc.). The data may be received from various sources including a home/user data base 306 (which may include information from one or more insurance sources), one or more publicly available sources 312 (e.g., publicly known information about certain systems or devices), and/or from user input received via one or more computing device, such as computing device 314a-314e.

Accordingly, the maintenance task generating module 310 may generate a maintenance plan for the home including one or more maintenance tasks. The maintenance tasks may be generated based on the received information associated with the home and information aggregated from various other homes and/or structures, similar systems, devices, etc. For instance, the system may receive aggregated data associated with one or more insurance claims (e.g., as received by the entity 301) from a data base, such as insurance data base 318. The information may include data associated with type of device or system, age, type of repairs, usage time before replacement, wear factors associated with building materials, and the like. By comparing the systems, devices, etc. associated with the home with the aggregate data for similar systems and/or devices, the maintenance task generating module 310 may identify one or more maintenance tasks that should be performed. Some examples of maintenance tasks may include replacement of a roof, replacement of a water heater, sewer cleaning, window replacement, refrigerator replacement, and the like. In some examples, the maintenance task generating module 310 may also prioritize the generated tasks (e.g., based on urgency, best return on investment, etc.).

In some examples, the maintenance task generating module 310 may also generate a time period in which the task should be performed. For instance, if a failure may be imminent, the maintenance task generating module 310 may determine that the task should be completed in a relatively short time period. In other examples, early signs of wear may be showing on a system or device and so a longer time period may be suggested for completing the maintenance task. Completion of the maintenance task within the suggested or predetermined time period may result in additional rewards being provided to the user, as will be discussed more fully below.

Once a maintenance task list has been generated, the list may be transmitted to a user, such as via one or more computing devices 314a-314e. For instance, the task list may be transmitted to a smart phone 314a, personal digital assistant (PDA) 314b, tablet 314c. cell phone 314d, or other computing device 314e, of the user. In some examples, the other computing device may include a vehicle on-board computing device and the task list may be displayed to the user via a display within the vehicle and/or may be provided via an audio transmission within the vehicle.

The home maintenance monitoring and reward system 300 may then monitor the various systems and/or devices associated with the home. Monitoring of the systems and or devices may be performed automatically, such as via data received from one or more sensing devices, and/or manually, such as via data received from a user associated with the home (e.g., user reporting of maintenance performed via one or more computing devices 314a-314e).

For instance, the home maintenance monitoring and reward system 300 may include a plurality of sensing devices 302a-302c. The sensing devices 302a-302c may be a variety of types of devices and may be used to monitor or sense one or more characteristics of a system, appliance, feature, device, etc. within a home. For instance, the sensing devices 302a-302c may include float switches, moisture sensors, power sensors or monitors, wear indicating devices, speed sensors, motion sensors, smoke or heat sensors, breakage sensors, cameras, proximity sensors, presence sensors, and the like. In other examples, the sensing devices 302a-302c may include devices for sensing temperature, sewage backup, natural gas, propane, etc., air quality (e.g., carbon monoxide, etc.), air flow quality, water flow, and the like.

The sensing devices may include one or more video monitoring devices such as security or other video cameras, live video feeds, and the like, that may receive and/or transmit video or other image data related to one or more appliances, systems, etc. In some examples, devices providing video monitoring or video feed may be monitoring the premises on a periodic or continuous basis. In some arrangements, the devices providing video monitoring or video feed may be in communication with one or more other sensing devices and may activate or begin monitoring, providing video feed, etc. upon an indication received from the one or more other sensing devices. Various other types of sensing devices and/or characteristics may be monitored via sensing devices 302a-302c.

In some arrangements, one or more of sensing devices 302a-302c may be connected to or in communication with one or more home devices, such as appliances, systems, etc., to monitor one or more characteristics of the home device. For instance, home devices or systems such as a water heater, sump pump, roof, attic (e.g., air flow in attic), washing machine, dryer, dishwasher, refrigerator, freezer, air conditioner, furnace, windows, pipes, occupancy, and the like, may be monitored to determine operating condition, whether repair or replacement is needed, whether repair or replacement has been performed (e.g., by an improvement in operating characteristics) etc. Various other appliances and/or systems may be monitored without departing from the invention.

Although the home maintenance monitoring and reward system 300 includes three sensing devices 302a-302c, the system 300 may include more or fewer sensing devices without departing from the invention. Further, in some examples, each sensing device may be a different type of device and/or may be configured to monitor different characteristics of the home device (e.g., sensing device 302a detects moisture while sensing device 302b detects power consumption). Additionally or alternatively, each sensing device 302a-302c may be connected to or in communication with a different home device, or multiple sensing devices 302a-302b may be connected to or in communication with a single home device such that multiple, different characteristics of the home device are being monitored (e.g., simultaneously). This may permit additional and/or more accurate information to be collected about the home device. Various combinations of the above-described arrangements may also be used without departing from the invention.

Signals and/or data from the sensing devices 302a-302c may be received by the home maintenance monitoring and reward system 300. For instance, signals, video feed, and/or data may be transmitted from the sensing devices 302a-302c to the system 300 via wired or wireless transmission. In some examples, the data and/or signals may be transmitted to a base unit for collection prior to transmission to the system 300 or entity 301 associated with the system 300. In other examples, the data and/or signals may be transmitted directly from each sensor 302 to the system 300 or entity 301.

The signals and/or data from the sensing devices 302a-302c may be received by a maintenance module 316. The maintenance module 316 may be connected to or in communication with the sensing devices 302, as well as other modules within the system 300, and may include hardware and/or software configured to perform specific functions within the system. For instance, the maintenance module 316 may be configured to receive data from sensors 302a-302c, as well as user reported maintenance data from one or more computing devices 314a-314e, and determine whether one or more tasks on the generated maintenance task list have been completed. Received data that may be used to determine whether a task is completed may include an indication that a system or device has been repaired/replaced (e.g., user input providing confirmation that a system/device has been repaired/replaced), sensor data indicating an improvement in operating conditions (e.g., a system or device was operating outside an expected performance range and is now operating within range and therefore the repair/replacement has been completed), and the like.

Upon determining by the maintenance module 316 that a task has been completed, the completed task information may be transmitted to a reward generating module 308. The reward generating module 308 may be connected to or in communication with one or more other modules within the system 300 and may include hardware and/or software configured to perform particular functions within the system 300. For instance, based on the task completed, timing of the task completion (e.g., time elapsed between generation of the maintenance task and completion), etc., a number of points or other reward may be generated for the user. The points and/or reward may be deposited in an account associated with the user and stored in account module 304. The points/rewards may be determined based on the task itself. For instance, replacement of a roof may result in a deposit of a certain number of points, while cleaning of gutters may result in a different number of points being deposited in the user account. In some examples, the tasks may be associated with different tier levels which may result in different numbers of points or rewards being awarded to the user. For instance, tier 1 tasks may include roof replacement, window replacement, addition of whole-house generator, or the like. These types of tasks may result in a greater number of points/rewards than tier 2 tasks, which may include items such as gutter cleaning, refrigerator water line replacement, sewer cleaning, and the like. While these two tiers are provided as examples, additional tiers having additional or differently arranged tasks may be used without departing from the invention.

In some examples, the rewards may include points, while in other examples, the rewards may include discounts or incentives. For instance, a reward may include a discount on a subsequent maintenance task. In another example, a reward may include a discount on an insurance premium associated with the home. In some arrangements, completion of a task may result in points and additional rewards (e.g., discounts, incentives, etc.) being deposited in the user's account. Additionally or alternatively, points may be redeemed for one or more additional rewards, such as discounts, incentives, and the like.

Additionally or alternatively, the user account stored in account module 304 may accumulate points. As the number of points in the user account meets certain predefined thresholds, the user may be designated as having a certain status, which may entitle the user to additional incentives and/or discounts. For instance, upon reaching a predetermined threshold number of points, the home and/or user may be considered "certified" or as having achieved "gold status" or any other designation of meeting the threshold. The threshold may be set at a number of points corresponding to a minimum level of maintenance that is considered by the entity to be desired to maintain the home in good working order and reduce risk of system/device failures, etc. Additional levels of status (e.g., "platinum," "highly certified," or the like) may be assigned to the user upon reaching a higher threshold number of points. The higher threshold number of points may correspond to a higher level of maintenance (e.g., a level determined to further reduce risk of failures).

Upon achieving one or more of the status levels, the user may be entitled to additional or greater incentives and/or discounts (e.g., greater discounts on future maintenance, additional insurance premium discounts, etc.). Further, upon reaching a certain status, the user may earn the right to that status on any other homes associated with the user. For instance, if a user achieves a certain status on his or her first home and then sells that home, the user may maintain the status achieved on the first home in association with the new home.

In other examples, achieving a certain status for the user may correspond to a status being assigned to the home as well. That is, reaching a threshold number of points may earn the home a designation of "certified" or "gold status," etc. that may be used as a selling incentive and/or may be carried over upon sale of the house. For instance, if a first owner of a home achieves a certain status, the home may be considered "certified" and the "certified" status may carry over when the home is then sold to a second owner. Accordingly, the second owner may be entitled to one or more rewards, discounts, and the like.

Figure 4:
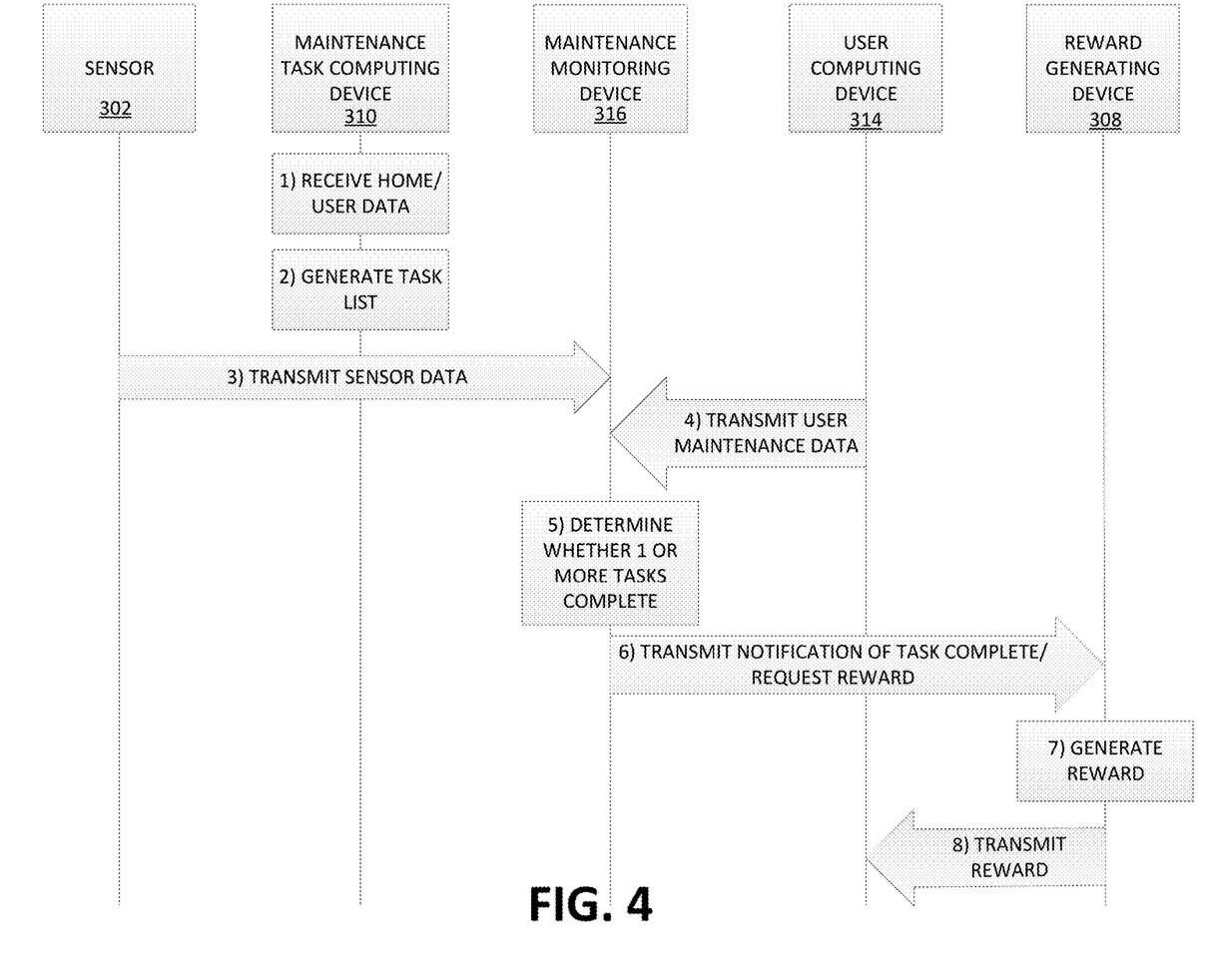
FIG. 4 is an example event sequence illustrating a process associated with the home maintenance monitoring and reward system, according to one or more aspects of the disclosure.

FIG. 4 depicts an illustrative event sequence for utilizing the home maintenance monitoring and reward system in accordance with one or more aspects discussed herein. The example shown in FIG. 4 is merely one example sequence and various other steps, processes, or the like, may be included in a sequence without departing from the invention.

In step 1, home and/or user data may be received at, for instance, a maintenance task generating device, such as maintenance task generating module 310 in FIG. 3. The data may include types of systems and/or devices within the home, ages of the devices and/or systems, materials used in building the home, user name, contact information, insurance policy information, and the like. In step 2, a maintenance task list may be generated by the maintenance task generating device. The maintenance task list may include a list of tasks, as well as a prescribed time frame for completion of each task.

At step 3, sensor data may be transmitted from one or more sensing devices, such as sensing devices 302a-302c) to a maintenance monitoring device, such as maintenance module 316 in FIG. 3. User maintenance data may be transmitted from one or more user computing devices 314 to the maintenance monitoring device in step 4.

Upon receipt of the sensor data and/or user maintenance data, the maintenance monitoring device 316 may determine whether one or more tasks on the generated task list have been completed in step 5. As discussed above, the determination regarding completion of the task may be based on user input indicating that a task is complete, and/or based on sensor data indicating an improvement in performance of the system or device. That is, if a device was previously operating outside of a desired operating range based on sensor data (e.g., power usage, water usage, or the like), and the device is not operating within the desired range according to received sensor data, a repair or replacement of the device was likely performance and, accordingly, an associated maintenance task may be marked complete.

In step 6, a notification of completion of the task may be transmitted to a reward generating device, such as reward generating module 308. The notification may, in some examples, include a time elapsed between generation of the maintenance tasks and completion of the task. If the elapsed time is within a predefined range, additional rewards or points may be credited to the user account.

In step 7, one or more rewards may be generated. The rewards may include points deposited in a user account associated with the home, discounts, incentives, and the like. In some examples, the discounts or incentives may be for use toward future maintenance on the home. For instance, if a roof was recently replaced, a reward for a discount on gutter cleaning may be generated for the user. The rewards may be generated based on type of maintenance task complete, expected cost of maintenance task completed (e.g., based on insurance claim or other data associated with similar repairs or replacements), and the like. In some examples, the reward may be generated by reviewing a look up table which may store various maintenance tasks associated with various systems and devices and may cross reference those tasks with related maintenance tasks, types of rewards, amounts of rewards, etc.

In step 8, a notification of the reward and/or deposit of points to a user account may be transmitted to a user computing device 314. Accordingly, the user may be aware of the noted completion of the maintenance task and associated deposit of a reward or points to the user's account.

Figure 5:
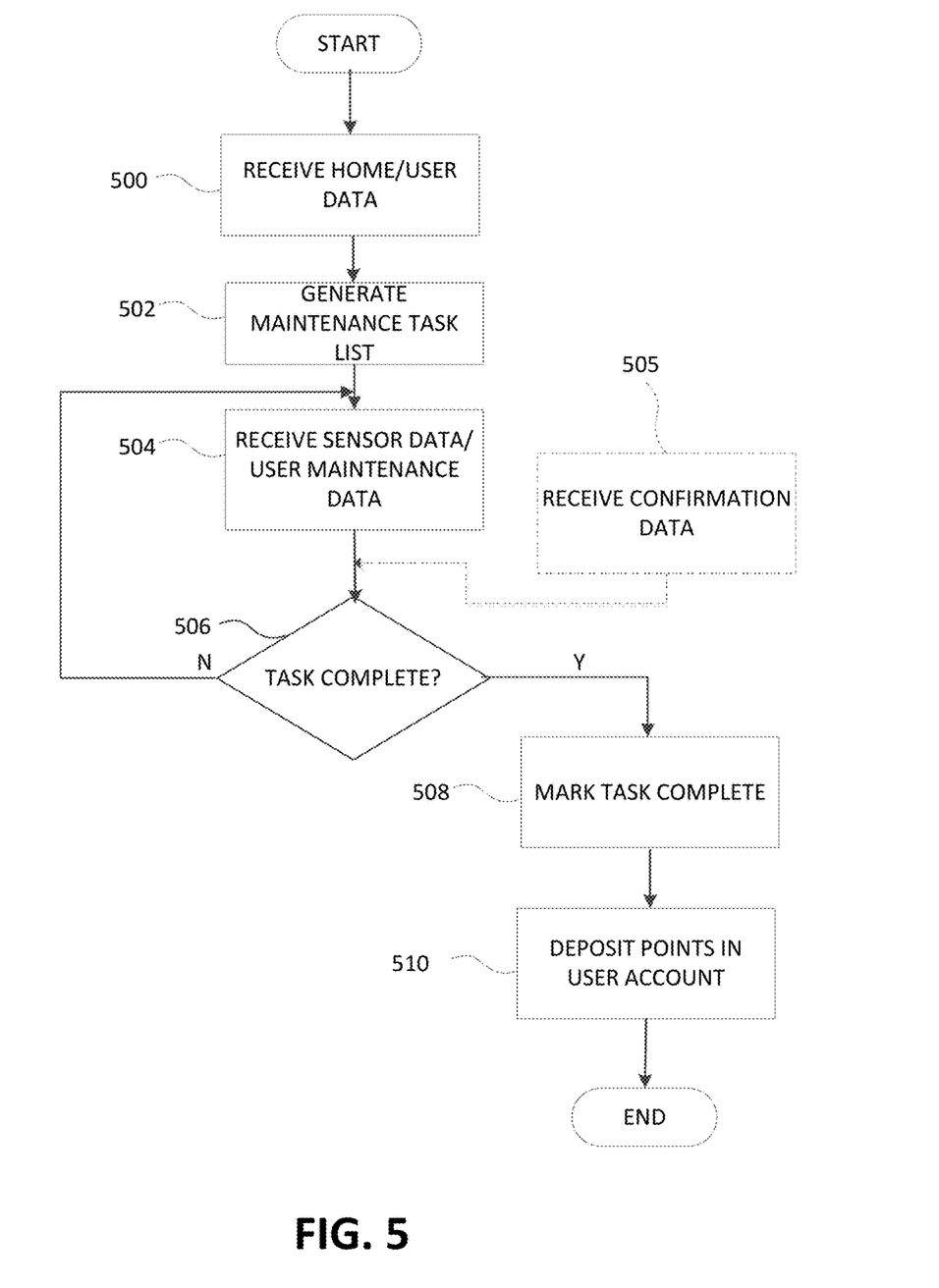
FIG. 5 is a flow diagram illustrating one example method of generating a maintenance task list, determining whether one or more tasks have been completed and generating a reward for a user, according to one or more aspects of the disclosure.

FIG. 5 illustrates one example method of generating a maintenance task list, determining whether one or more tasks have been completed and generating a reward for a user. In step 500, home and/or user data may be received by the system. As discussed above, the home and/or user data may include types of systems or devices, age of systems/devices, building materials used, insurance information, and the like. In step 502, a maintenance task list may be generated for the home/user. The maintenance task list may include one or more recommended maintenance tasks, as well as a recommended time period in which to complete the maintenance task.

In step 504, maintenance data may be received. In some examples, the maintenance data may include data received from one or more sensing devices associated with a system or device within the home. Additionally or alternatively, the maintenance data may include maintenance data provide by a user (e.g., via a user computing device). In optional step 505, confirmation of task completion may be received. For instance, a contractor or service provider (e.g., performing the maintenance) may transmit an indication (e.g., from a system or computing device of the service provider in communication with the home maintenance monitoring and reward system) that maintenance has been performed/completed.

In step 506, a determination may be made as to whether one or more tasks have been completed. If not, the system will return to step 504 to receive additional maintenance data. If one or more tasks have been completed, the task may be marked complete in step 508 and an associated number of points and/or a reward may be deposited into a user account associated with the home.

Figure 6:
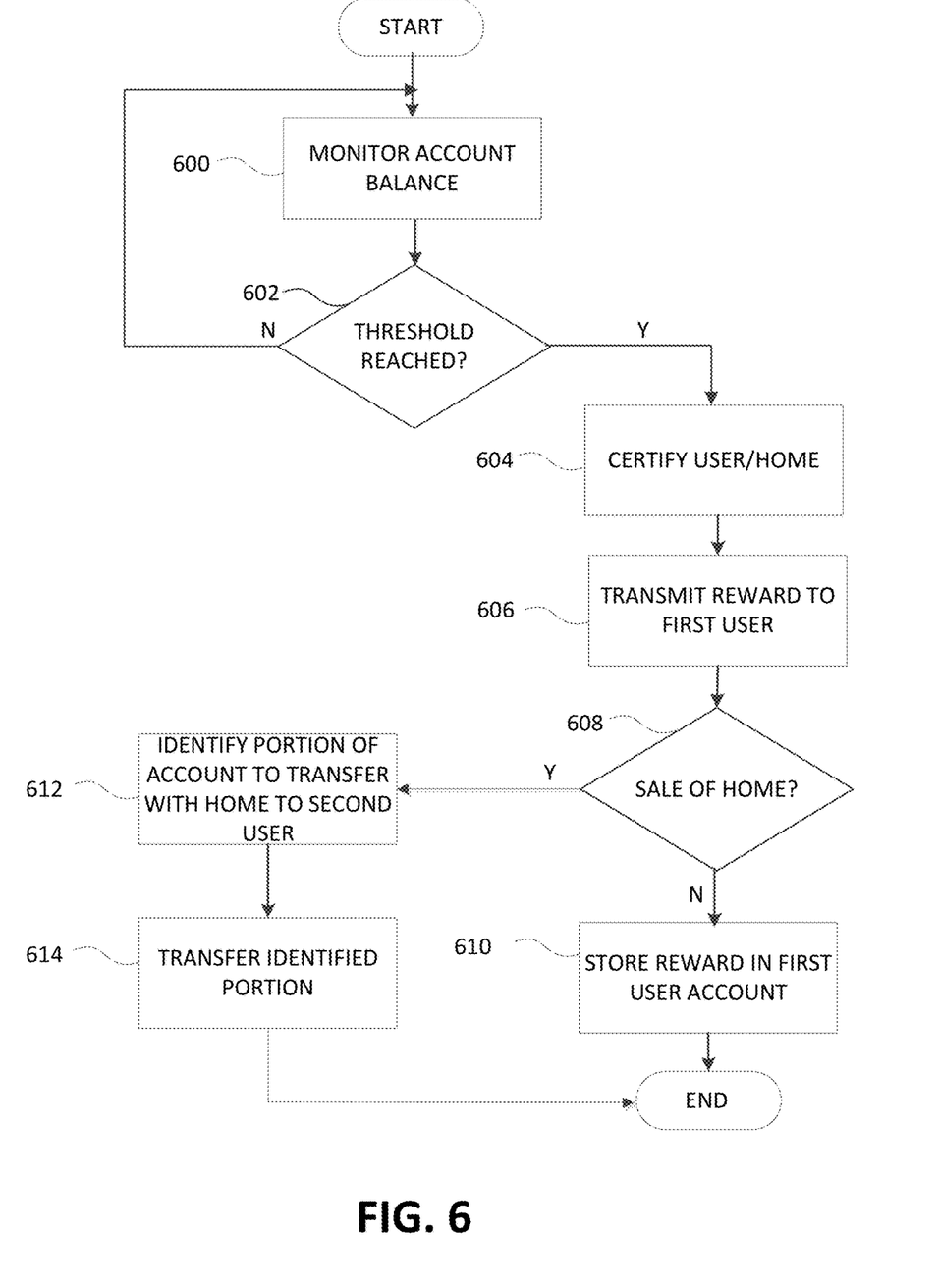
FIG. 6 is a flow diagram illustrating an example method of determining whether a user has reached a point threshold according to one or more aspects of the disclosure.

FIG. 6 illustrates an example method of determining whether a user has reached a point threshold according to one or more aspects described herein. In step 600, an account balance of a user account associated with a home may be monitored. In step 602, a determination may be made as to whether a points or other predetermined threshold has been reached. If not, the system will continue to monitor the balance of the account.

If the threshold has been met, the user and/or associated home may be considered as achieving a status in step 604. For instance, the user and/or home may be considered "certified." Certification of a home or user may result in a reward and/or points being deposited into an account of the user in step 606.

In step 608, a determination is made as to whether the home associated with the account has been sold or transferred to a second user. If not, the generated reward/points may be stored in the account of the user for future use. If, in step 608, a determination is made that the house has been sold or transferred, in step 612, the system may determine a portion of the account balance, if any, to remain with the user and/or a portion, if any, that will transfer with the home. For instance, some or all of the rewards and/or points may remain with the home upon transfer of ownership or occupancy. This may be an incentive for a potential buyer of the home. Further, the "certified" status of the home may remain with the home upon transfer of the home.

Additionally or alternatively, some or all of the rewards and/or points in an account may remain with the user as the user moves to a second or subsequent home. The user, if deemed certified or having achieved a predefined status, may maintain that status in association with the new home, for at least a predetermined time period. Accordingly, the user may redeem rewards and/or points earned on a first home for repairs and/or maintenance on a subsequent home.

In some examples, a status earned may be valid for a predetermined period of time (e.g., even if the balance in the user account drops below the status threshold). For instance, upon a achieving a threshold number of points (and therefore achieving a certain status) the user/home may enjoy the status for, for instance, one year. Upon expiration of the one year, or other predetermined period of time, the achieved status may expire unless the user has continued to earn points by performing maintenance on the home. That is, the status level may be continually renewed by the user earning additional points by performing maintenance.

In step 614, the identified portion(s) of the account balance may be transferred with the user and/or with the home, according to the determination made in step 612. The portions of transferability of the account balance may be based on user preference, type of account, status level achieved, or any of various other factors.

Figure 7:
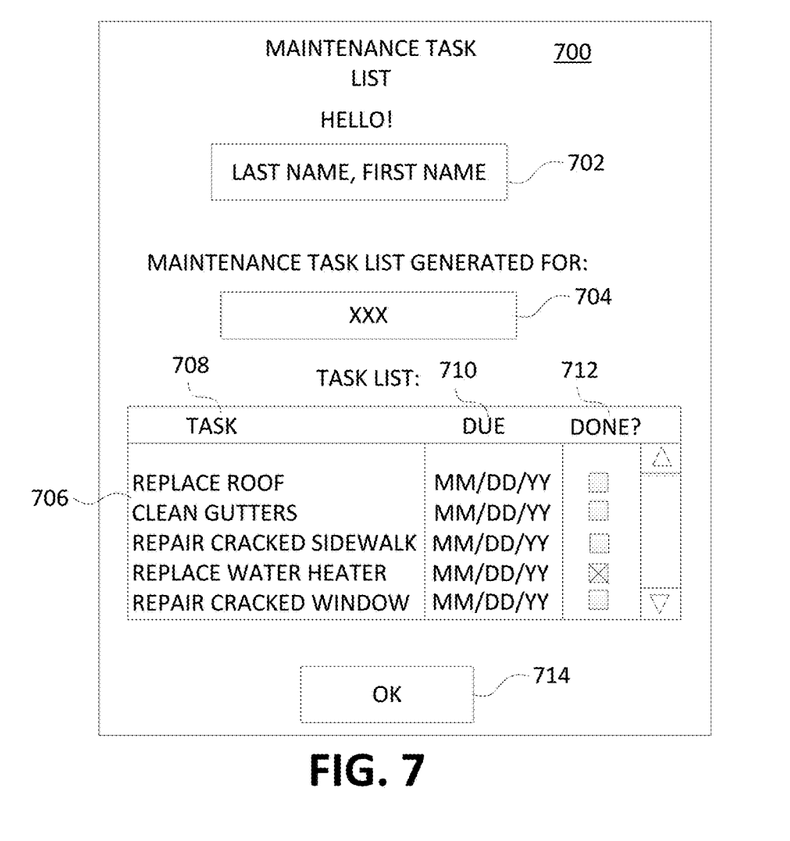
FIG. 7 is one example user interface for displaying an example maintenance task list according to one or more aspects of the disclosure.

FIG. 7 illustrates one example user interface displaying a generated maintenance task list according to one or more examples discussed herein. The user interface 700 includes field 702 in which a user is identified, and field 704, in which the home or structure associated with the maintenance task list is identified.

Interface 700 further includes the generated task list in field 706. The task list includes a column identifying tasks generated for the particular home or structure in column 708. Column 710 provides a recommended completion date (e.g., if completed by recommended date additional rewards and/or points may be generated for the user). Column 712 includes an identification of whether the task has been completed. For instance, task list 706 indicates that the water heater has been replaced. Completion of the task may be determined by received sensor data and/or user input, as discussed herein. Additionally or alternatively, a contractor or other professional service provider performing the repair/replacement or providing parts, or other services, may be relied up to provide an indication that the task is complete or confirm other received data (either sensor data or user input) indicating that the task is complete. In some examples, the contractor or service provider may be a service provider recommended by or associated with the entity implementing the system. Once the user is finished, he or she may select "OK" option 714.

In other examples, confirmation of the completed work may also be provided by visual or other documentation transmitted to the entity. For instance, the user may take a photograph or video of the repaired or replaced system or device. The photo or video may be captured with a user computing device (such as a smart phone, tablet, or the like) and may be transmitted or uploaded to the system. In other examples, an image of a receipt from a contractor or other service provider may be used to confirm that a task has been completed. The receipt may be photographed (e.g., by the computing device of the user) and the image transmitted to the entity.

Figure 8:
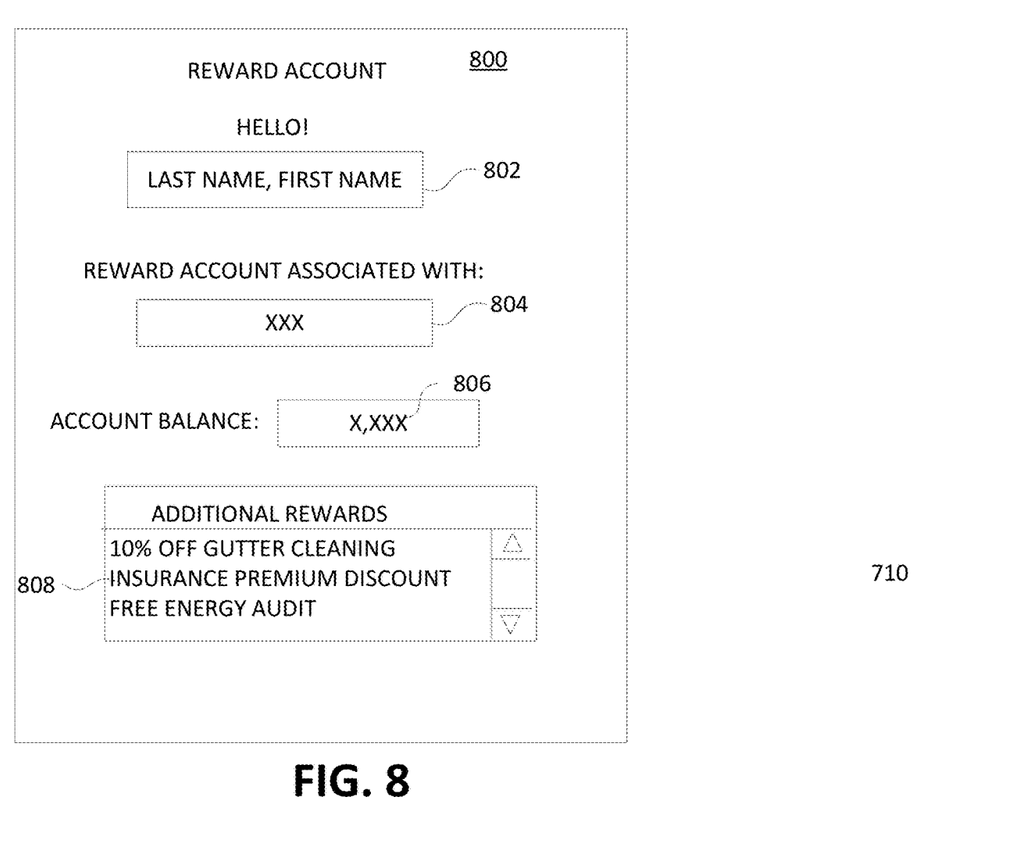
FIG. 8 is an example user interface for displaying example account information of a user, according to one or more aspects of the disclosure.

FIG. 8 illustrates one example user interface 800 displaying user account and reward information. The interface 800 includes field 802 in which the user associated with the account is identified, as well as field 804 in which the home associated with the user or account is identified.

Interface 800 further includes field 806 in which a number of points or account balance is displayed. Field 808 displays additional rewards earned by and available to the user. Various other types of additional rewards may be listed as well. The additional rewards shown are merely some example rewards. In some arrangements, selection of an additional reward (such as by clicking or double clicking) or selection of the points field 806 may prompt display of another user interface to redeem the points or additional reward.

As discussed herein, points and/or rewards may be used to obtain insurance related discounts or incentives. For instance, additional rewards may include a discount on an insurance premium, a reduction or discount on an insurance deductible, and the like. Additionally or alternatively, the points may be converted to funds that may be used to make a payment on an insurance premium or may be used toward an insurance deductible. For instance, a certain number of points may equate to $25 dollars that may be used toward payment of a premium or to reduce a deductible.

In another example, the points may be converted to funds that may be used toward payment of a contractor or other service provider performing maintenance on the home. For instance, a user may convert a portion of the earned points to cash that can be redeemed when paying the contractor or service provider. In some examples, if the service provider is associated with the entity, the user may use points as a method of payment.

In some arrangements, completion of one or more maintenance tasks on a task list may result in additional tasks being generated. For instance, as tasks are completed, more tasks may be generated, such that an ongoing task list may be continuously generated in order to maintain the home, thereby providing users with additional opportunities to earn points and/or additional rewards. In other examples, a new or updated task list may be generated a predefined intervals (e.g., upon completion of two tasks, upon completion of a certain percentage of the number of current tasks, etc.) or at predefined times (e.g., every month, every 3 months, every 6 months, etc.). Accordingly, the task list may be updated often in order to ensure that the home is being maintained according to recommendations.

The following is one example implementation of the home maintenance monitoring and reward system described herein. It is intended as one example and should not be viewed as limiting the system or arrangements discussed herein. Rather, various other implementations are available without departing from the invention.

In one example, a user may purchase a home and may obtain home owner's insurance. The insurance provider may provide the user with the systems and arrangements discussed herein. Accordingly, upon purchasing the home, or upon obtaining the insurance, the user may set up a maintenance/reward account. The account may, in some examples, be automatically established upon purchase of the home or insurance, or may be requested by the user. Once the account is established, the system may receive information associated with the home and various systems and devices of the home. For instance, based on the insurance information, as well as other publicly available information, the system may determine that the house includes a roof, an HVAC system, plumbing systems, as well as devices such as a washer, dryer, dishwasher, water heater, and the like. In some examples, the systems and devices may be extracted from insurance information associated with the home. In other examples, the systems and devices may be received via user input.

Additional information associated with the identified systems and devices may also be received. For instance, an age of various systems or devices may be received, materials used in building the systems, age of the home, and the like, may be received (e.g., via insurance information, user input, etc.). Accordingly, the system may generate a maintenance task list that, based on the systems and devices within the home, as well as the additional information received about the systems and devices, includes maintenance tasks recommended for completion. The system may also generate a recommended completion date. In this example, the home may have a new roof, a 15 year old water heater, uneven sidewalks, and relatively new appliances. Accordingly, the system may generate a task list that includes replacing the water heater and repairing or replacing the sidewalks. The generated maintenance task list would be advantageous because it may be based on aggregated data from thousands or possibly hundreds of thousands of similar systems, devices, etc., maintenance performed thereon, performance data, insurance claim data, or the like. That is, the aggregated data may be used to determine which maintenance tasks should be performed for the specific systems and devices of the home, based on historical data of other similar systems and devices. Creation of such a task list is performed via the special purpose computing devices described herein.

Upon completion of the identified maintenance tasks, a predefined number of points may be deposited in the account of the user. For instance, each task may be associated with a predetermined number of points. Additionally or alternatively, as discussed herein, the tasks may be assigned different tiers and the tier may determine a number of points deposited in a user account. In addition, if any of the tasks are completed within a recommended time frame, additional points and/or other rewards may be deposited into the user's account. For instance, completion of the task within the recommended time frame may result in 10% more points being deposited in the account. Various other bonuses may be used without departing from the invention.

In some examples, points may be worth additional value when being redeemed for certain tasks. For instance, if points are being redeemed to perform a task directed to improving the safety of the structure or surrounding area, the points may be multiplied or fewer points may be required for payment, to obtain a certain discount, or the like. Further, in some arrangements, additional points or rewards may be earned upon completion of a task in advance of an expected peril. For instance, if a high winds are expected, a user may complete a task associated with trimming or removing loose branches or debris around a house and may earn additional points or rewards for completing the task prior to the high winds arriving.

As points accumulate in the account, the user may achieve different levels of status, which may result in additional points or bonuses for the user. The user may then use or redeem the points or rewards for subsequent maintenance projects, as payment for an insurance premium, or the like.

In some arrangements, the points/rewards may be transferred or gifted to other individuals. For instance, the points/rewards may be transferred or gifted to a third party for their use toward one or more maintenance projects. In some examples, the third party may be associated with the entity implementing the system (e.g., a customer of the insurance provider), while in other arrangements the third party might not be associated with the entity.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A home maintenance monitoring and reward system, comprising:
   a plurality of sensors associated with a home;
   a home maintenance monitoring system server including one or more processors, and at least one memory storing computer-readable instructions that, when executed by the one or more processors, cause the home maintenance monitoring system server to:
   receive data associated with the home;
   generate, based on the received data associated with the home, a maintenance task list for the home, the maintenance task list including a plurality of maintenance tasks to be performed on the home;
   receive, via a communication interface and from the plurality of sensors associated with the home, first signals associated with a home device;
   receive, via the communication interface and from the plurality of sensors associated with the home, second signals associated with the home device, the second signals being received subsequent to receipt of the first signals;
   analyze the received first signals and the received second signals to determine whether maintenance was performed on the home device, the analyzing including:
     determining, based on the received first signals, a first operating range of the home device;
     determining, based on the received second signals, a second operating range of the home device; and
     comparing the first operating range to the second operating range to determine whether operation of the home device has improved;
   responsive to determining that operation of the home device has improved, determine whether at least one task on the maintenance task list has been completed; and
   responsive to determining that the at least one task has been completed, marking the task complete on the maintenance task.

2. The home maintenance monitoring and reward system of claim 1, the home maintenance monitoring system server further including instructions that, when executed, cause the home maintenance monitoring system server to:
   generate a reward based on completion of the at least one task, the reward including at least one of: an insurance discount and a discount on future maintenance.

3. The home maintenance monitoring and reward system of claim 1, wherein the generated maintenance task list includes the plurality of maintenance tasks and a recommended completion date for each task of the plurality of maintenance tasks.

4. The home maintenance monitoring and reward system of claim 3, wherein determining whether the at least one task on the maintenance task list has been completed further includes:
   determining, whether the at least one task on the maintenance task list has been completed by the recommended completion date for the at least one task;
   responsive to determining that the at least one task was not completed by the recommended completion for the at least one task, transmitting a determined number of reward points to an account; and
   responsive to determining that the at least one task was completed by the recommended completion date, transmitting the determined number of reward points and an additional number of reward points to the account.

5. The home maintenance monitoring and reward system of claim 1, wherein generating the maintenance task list for the home further includes comparing a listing of systems and devices associated with the home with insurance claim information to determine the plurality of maintenance tasks for the maintenance task list.

6. The home maintenance monitoring and reward system of claim 1, the home maintenance monitoring system server further including instructions that, when executed, cause the home maintenance monitoring system server to:
   determine whether the home has been transferred to another user; and
   responsive to determining that the home has been transferred to another user, identifying a portion of a balance of reward points in an account to be transferred from a first user to the other user and a portion of the balance of reward points to remain with the first user.

7. The home maintenance monitoring and reward system of claim 1, wherein determining whether the at least one task on the maintenance task list has been completed is based on sensor data received from one or more of the plurality of sensors associated with the home.

8. The home maintenance monitoring and reward system of claim 1, wherein determining whether the at least one task on the maintenance task list has been completed is based on at least one of: a photo and a video uploaded to the home maintenance monitoring and reward system.

9. The home maintenance monitoring and reward system of claim 1, wherein the plurality of sensors includes a plurality of sensor types.

10. The home maintenance monitoring and reward system of claim 9, wherein the plurality of sensor types includes at least two of: power sensor, moisture sensor, heat sensor, smoke sensor and motion sensor.

11. A home maintenance monitoring and reward system, comprising:
   a plurality of sensing devices connected to a plurality of systems and devices within a home;
   an home maintenance monitoring system server including one or more processors, and at least one memory storing computer-readable instructions that, when executed by the one or more processors, cause the home maintenance monitoring system server to:
   receive data associated with the home;
   generate, based on the received data associated with the home, a maintenance task list for the home, the maintenance task list including a plurality of maintenance tasks to be performed on the home;

receive, via a communication interface and from at least one sensing device of the plurality of sensing devices, first signals associated with at least one system or device of the plurality of systems and devices within the home;

receive, via the communication interface and from the at least one sensing device of the plurality of sensing devices, second signals associated with the at least one system or device of the plurality of systems and devices within the home, the second signals being received subsequent to receipt of the first signals;

analyze the received first signals and the received second signals to determine whether maintenance was performed on a home device, the analyzing including:
 determining, based on the received first signals, a first operating range of the at least one system or device;
 determining, based on the received second signals, a second operating range of the at least one system or device; and
 comparing the first operating range to the second operating range to determine whether operation of the at least one system or device has improved;

responsive to determining that operation of the at least one system or device has improved, determine whether at least one task on the maintenance task list has been completed; and responsive to determining that the at least one task has been completed, marking the task complete on the maintenance task list.

12. The system of claim 11, wherein the generated maintenance task list includes the plurality of maintenance tasks and a recommended completion date for each task of the plurality of maintenance tasks.

13. The system of claim 12, wherein determining whether the at least one task on the maintenance task list has been completed further includes:
 determining whether the at least one task on the maintenance task list has been completed by the recommended completion date for the at least one task;
 responsive to determining that the at least one task was not completed by the recommended completion for the at least one task, transmitting a determined number of reward points to an account; and
 responsive to determining that the at least one task was completed by the recommended completion date, transmitting the determined number of reward points and an additional number of reward points to the account.

14. The system of claim 11, wherein the data associated with the home is received from at least one of: an insurance system database and a database of public information.

15. The system of claim 11, wherein the data associated with the home includes a listing of systems and devices associated with the home.

16. The system of claim 15, wherein generating the maintenance task list for the home further includes comparing the listing of systems and devices associated with the home with insurance claim information to determine the plurality of maintenance tasks for the maintenance task list.

17. One or more non-transitory computer-readable media storing computer-executable instructions that, when executed by a processor, cause a home maintenance monitoring server to:
 receive data associated with a home;
 generate, based on the received data associated with the home, a maintenance task list for the home, the maintenance task list including a plurality of maintenance tasks to be performed on the home;
 receive, via a communication interface and from a plurality of sensors associated with the home, first signals associated with a home device;
 receive, via the communication interface and from the plurality of sensors associated with the home, second signals associated with the home device, the second signals being received subsequent to receipt of the first signals;
 analyze the received first signals and the received second signals to determine whether maintenance was performed on the home device, the analyzing including:
  determining, based on the received first signals, a first operating range of the home device;
  determining, based on the received second signals, a second operating range of the home device; and
  comparing the first operating range to the second operating range to determine whether operation of the home device has improved;
 responsive to determining that operation of the home device has improved, determine whether at least one task on the maintenance task list has been completed; and
 responsive to determining that the at least one task has been completed, marking the task complete on the maintenance task list.

18. The one or more non-transitory computer-readable media of claim 17, wherein the generated maintenance task list includes the plurality of maintenance tasks and a recommended completion date for each task of the plurality of maintenance tasks.

19. The one or more non-transitory computer-readable media of claim 18, wherein determining whether the at least one task on the maintenance task list has been completed further includes:
 determining whether the at least one task on the maintenance task list has been completed by the recommended completion date for the at least one task;
 responsive to determining that the at least one task was not completed by the recommended completion for the at least one task, transmitting a determined number of reward points to an account; and
 responsive to determining that the at least one task was completed by the recommended completion date, transmitting the determined number of reward points and an additional number of reward points to the account.

20. The one or more non-transitory computer-readable media of claim 17, wherein the data associated with the home includes a listing of systems and devices associated with the home and wherein generating the maintenance task list for the home further includes comparing the listing of systems and devices associated with the home with insurance claim information to determine the plurality of maintenance tasks for the maintenance task list.

* * * * *